United States Patent
Himmelmann

(10) Patent No.: US 11,162,637 B2
(45) Date of Patent: Nov. 2, 2021

(54) SUMP COVER ASSEMBLY FOR GENERATOR

(71) Applicant: Hamilton Sundstrand Corporation, Charlotte, NC (US)

(72) Inventor: Richard A. Himmelmann, Beloit, WI (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 199 days.

(21) Appl. No.: 16/588,525

(22) Filed: Sep. 30, 2019

(65) Prior Publication Data

US 2021/0095817 A1 Apr. 1, 2021

(51) Int. Cl.
*F16N 31/00* (2006.01)
*B64D 33/00* (2006.01)
*F16N 7/40* (2006.01)

(52) U.S. Cl.
CPC ........... *F16N 31/002* (2013.01); *B64D 33/00* (2013.01); *F16N 7/40* (2013.01); *F16N 2210/20* (2013.01)

(58) Field of Classification Search
CPC .. F16N 31/002; F16N 31/006; F01M 11/0004
See application file for complete search history.

(56) References Cited

U.S. PATENT DOCUMENTS

| | | | |
|---|---|---|---|
| 1,874,585 A | 8/1932 | Newcomb | |
| 3,420,335 A | 1/1969 | Dochterman | |
| 4,545,791 A | 10/1985 | Schweikl et al. | |
| 4,793,299 A * | 12/1988 | Ishimura | F02F 7/008 123/195 A |
| 4,940,115 A | 7/1990 | Sugden | |
| 5,060,759 A | 10/1991 | Dussourd et al. | |
| 5,467,843 A * | 11/1995 | Esch | F02F 7/0007 184/6.5 |
| 5,706,873 A * | 1/1998 | Benoit | F16N 31/002 137/513.7 |
| 5,960,908 A * | 10/1999 | Kasahara | F01M 11/0004 184/106 |
| 9,541,312 B2 | 1/2017 | Woolley et al. | |
| 10,100,671 B2 | 10/2018 | Takabatake et al. | |

(Continued)

FOREIGN PATENT DOCUMENTS

| | | | |
|---|---|---|---|
| EP | 2975227 A1 | 1/2016 | |
| EP | 3798424 A1 * | 3/2021 | B64D 33/00 |

OTHER PUBLICATIONS

European Search Report; Application No. 19216297.2-1004; dated Jul. 27, 2020; 9 pages.

*Primary Examiner* — Minh Truong
(74) *Attorney, Agent, or Firm* — Cantor Colburn LLP

(57) ABSTRACT

Disclosed is a sump cover for a sump basin of a generator of an aircraft, the sump cover having: a sump cover shell shaped as an inverted bowl, a front portion of the sump cover shell including a first plurality of fastener features, each configured to fasten to one of a second plurality of fastener features in the sump basin; and a sump cover support extending outwardly from the sump cover shell, past a perimeter edge of the sump cover shell, configured to fit through a sump port and against a sump tube of the sump basin, wherein the sump cover support and the first plurality of fastener features define a multi-point mounting configuration between the sump cover and the sump basin.

19 Claims, 7 Drawing Sheets

(56) References Cited

U.S. PATENT DOCUMENTS

| | | | |
|---|---|---|---|
| 10,221,766 B2 | 3/2019 | Wotzak | |
| 2001/0047996 A1* | 12/2001 | Weingaertner | F16H 57/0408 220/571 |
| 2004/0007520 A1* | 1/2004 | Rosendahl | F01M 11/0004 210/435 |
| 2004/0129368 A1* | 7/2004 | Mauelshagen | F01M 11/0004 156/73.6 |
| 2006/0180541 A1* | 8/2006 | Hueppchen | B01D 35/0273 210/450 |
| 2010/0019505 A1 | 1/2010 | Frost | |
| 2010/0212623 A1* | 8/2010 | Jessberger | F01M 11/0004 123/196 R |
| 2010/0212867 A1* | 8/2010 | Hollweck | F01M 11/0004 165/104.19 |
| 2011/0303677 A1* | 12/2011 | Heppner | F01M 11/0004 220/563 |
| 2013/0227960 A1 | 9/2013 | Bonner | |
| 2015/0300220 A1* | 10/2015 | Mordukhovich | F16H 57/0452 184/106 |
| 2017/0254238 A1* | 9/2017 | Boehringer | F01M 11/064 |
| 2018/0051702 A1 | 2/2018 | Kupiszewski et al. | |
| 2018/0283283 A1 | 10/2018 | Manoukian et al. | |

\* cited by examiner

SUMP COVER ASSEMBLY FOR GENERATOR

BACKGROUND

The disclosed embodiments are directed at a generator for an aircraft and more specifically to a sump cover for the generator.

Throughout history, engineers have been designing vehicles that can fly. These flying vehicles require electricity for aircraft avionics, flight controls, passenger comfort, and various other subsystems. Aircraft electric power is typically generated by engine driven generators and auxiliary power unit (APU) driven generators. These generators and APUs need a lubricant such as oil for lubrication and cooling of internal components. Lubricant may drain from the internal components during use. The drained lubricant may remain within the housing of the generator or APU, for example, within an internal sump basin. The drained lubricant suctioned from the sump basin using a scavenger pump and may then be recirculated. One issue with recirculating the lubricant is that at certain pressures, scavenger pumps may become less effective in suctioning the drained lubricant from the sump basins.

SUMMARY OF THE DISCLOSURE

Disclosed is a sump cover for a sump basin of a generator of an aircraft, the sump cover comprising: a sump cover shell shaped as an inverted bowl, a front portion of the sump cover shell including a first plurality of fastener features, each configured to fasten to one of a second plurality of fastener features in the sump basin; and a sump cover support extending outwardly from the sump cover shell, past a perimeter edge of the sump cover shell, configured to fit through a sump port and against a sump tube of the sump basin, wherein the sump cover support and the first plurality of fastener features define a multi-point mounting configuration between the sump cover and the sump basin.

In addition to one or more of the above disclosed aspects or as an alternate the front portion extends downwardly beyond a rest of the sump cover shell to define a perimeter step on both sides of the front portion, thereby defining a perimeter flow recess for the sump cover when the sump cover is installed in the sump basin, the perimeter flow recess defining a fluid flow path between the sump cover and the sump basin.

In addition to one or more of the above disclosed aspects or as an alternate the perimeter step has a height of 0.075 inches.

In addition to one or more of the above disclosed aspects or as an alternate the front portion is thicker than a rest of the sump cover shell of the sump cover.

In addition to one or more of the above disclosed aspects or as an alternate the first plurality of fastener features are through-holes.

In addition to one or more of the above disclosed aspects or as an alternate the sump cover shell includes: a plurality of perimeter portions including the front portion, a back portion that opposes the front portion, a first side portion and a second side portion that opposes the first side portion; and a top portion that is substantially planar, wherein the front portion is planar and is substantially perpendicular to the top portion.

In addition to one or more of the above disclosed aspects or as an alternate the front portion includes a perimeter fitting recess between the first plurality of fastener features, the perimeter fitting recess forming an arcuate shape for mounting the sump cover against a tubular conduit that forms the sump tube in the sump basin.

In addition to one or more of the above disclosed aspects or as an alternate the sump cover support defines a leg that is disposed at an angle to the top portion.

In addition to one or more of the above disclosed aspects or as an alternate the sump cover support is closer to the back portion than the front portion.

In addition to one or more of the above disclosed aspects or as an alternate the sump cover support is closer to a first corner between the back portion and the first side portion than a second corner between the back portion and the second side portion.

In addition to one or more of the above disclosed aspects or as an alternate when the sump cover is secured to the sump basin, the sump cover support is piloted into the sump port, whereby the sump cover support is pressed against a back end of the sump port.

In addition to one or more of the above disclosed aspects or as an alternate each of the back portion, the first side portion, the second side portion, the first corner and the second corner are curved.

Further disclosed is a generator of an aircraft, comprising: a sump cover having one or more of the above disclosed aspects; a shaft extending through the generator; the sump basin defined by a bottom portion of the generator; the sump basin including the sump port; the sump tube connected to the sump basin through the sump port, the sump tube being exterior to the sump basin; and the bottom portion of the generator further including the second plurality of fastener features; wherein: the sump cover is supported over the sump port; the first plurality of fastener features is fastened to the second plurality of fastener features; and the sump cover support extends through the sump port and is disposed in the sump tube of the sump basin.

In addition to one or more of the above disclosed aspects or as an alternate the second plurality of fastener features are through-holes.

In addition to one or more of the above disclosed aspects or as an alternate a plurality of bolts each engage one of the first plurality of fastener features and a corresponding one of the second plurality of fastener features.

In addition to one or more of the above disclosed aspects or as an alternate the front portion extends downwardly beyond a rest of the sump cover shell to define a perimeter step on both sides of the front portion, thereby defining a perimeter flow recess for the sump cover when the sump cover is installed in the sump basin, the perimeter flow recess defining a fluid flow path between the sump cover and the sump basin; and the perimeter flow recess between the sump cover and the bottom portion of the generator is 0.075 inches.

In addition to one or more of the above disclosed aspects or as an alternate a tubular conduit is formed in the sump basin that defines the sump tube, the tubular conduit being disposed between the second plurality of fastener features; and the front portion includes a perimeter fitting recess between the first plurality of fastener features, the perimeter fitting recess forming an arcuate shape for mounting the sump cover against the tubular conduit.

In addition to one or more of the above disclosed aspects or as an alternate the sump port includes a back end, and the sump cover support is piloted into the sump port, whereby the sump cover support is pressed against the back end of the sump port.

Further disclosed is an aircraft including a generator having one or more of the above disclosed aspects.

Further disclosed is a method of operating a generator of an aircraft, comprising: running the generator; catching oil that is draining from the generator within a sump basin of a generator; and suctioning the oil in the sump basin, under a perimeter flow recess of a sump cover that is secured to the sump basin and covers a sump port, so that the oil is suctioned toward the sump port.

BRIEF DESCRIPTION OF THE FIGURES

The present disclosure is illustrated by way of example and not limited in the accompanying figures in which like reference numerals indicate similar elements.

DETAILED DESCRIPTION

Figure 1:
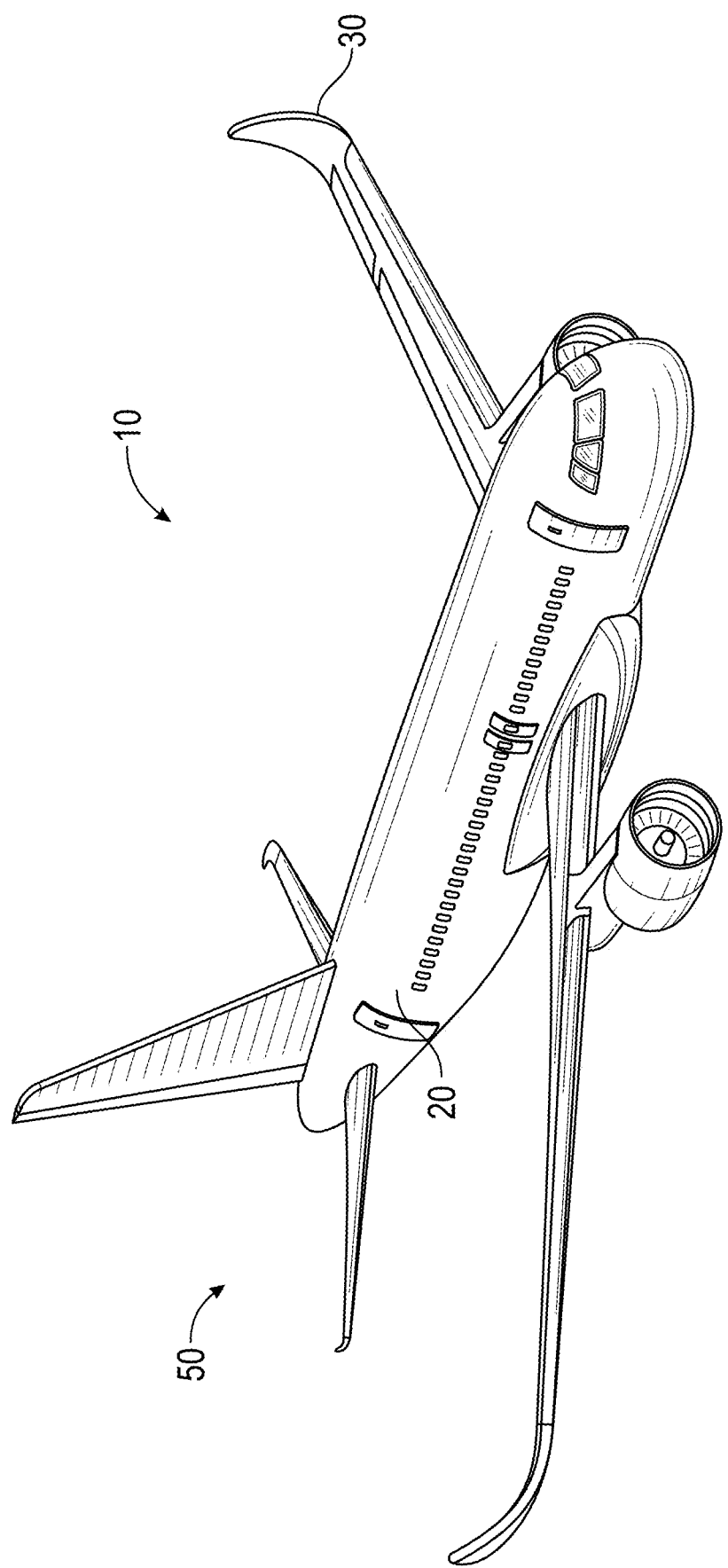
FIG. 1 shows an aircraft that may contain one or more features of the disclosed embodiments.
Figure 2:
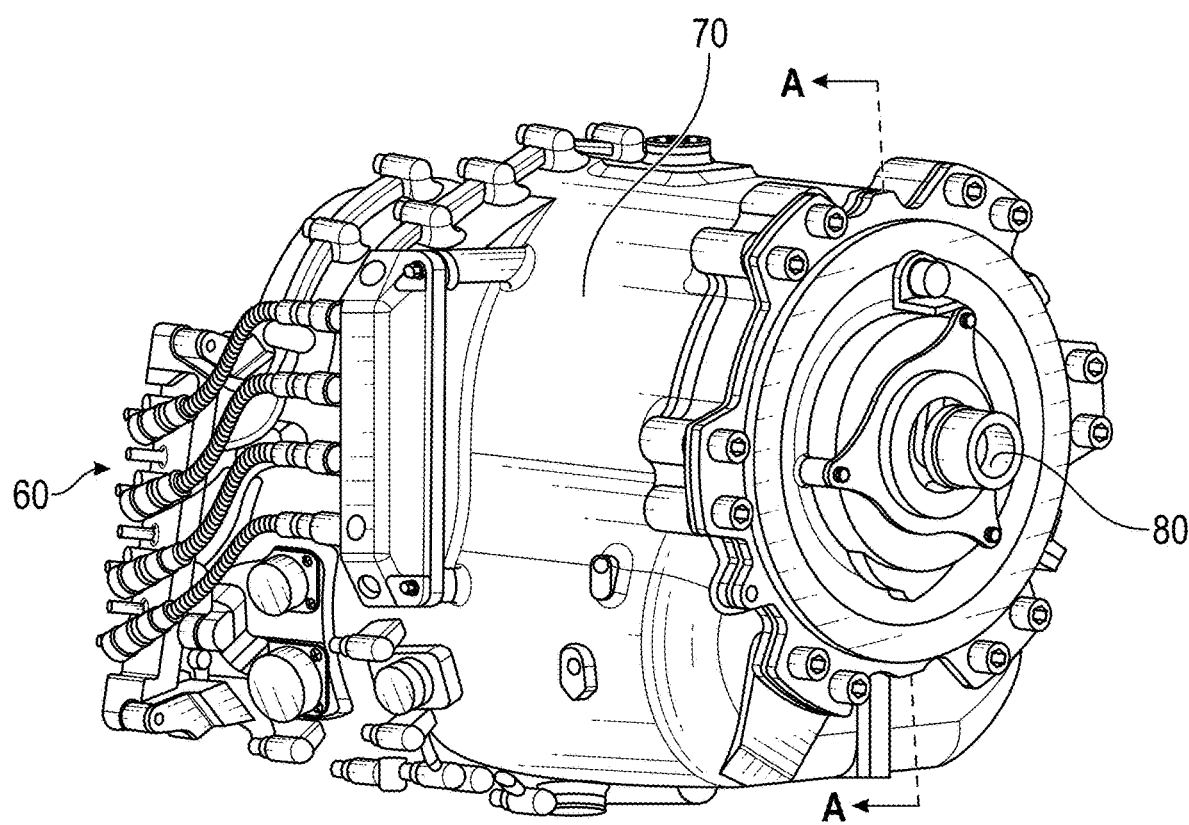
FIG. 2 shows a generator for the aircraft of FIG. 1, where the generator may contain one or more features of the disclosed embodiments

Turning to FIGS. 1 and 2, an aircraft 10 may have a fuselage 20, a pair of wings 30 and an empennage 50. One or more locations in the aircraft may include a generator 60. The generator 60 may have a shaft 80 extending from within the generator 60.

Figure 3:
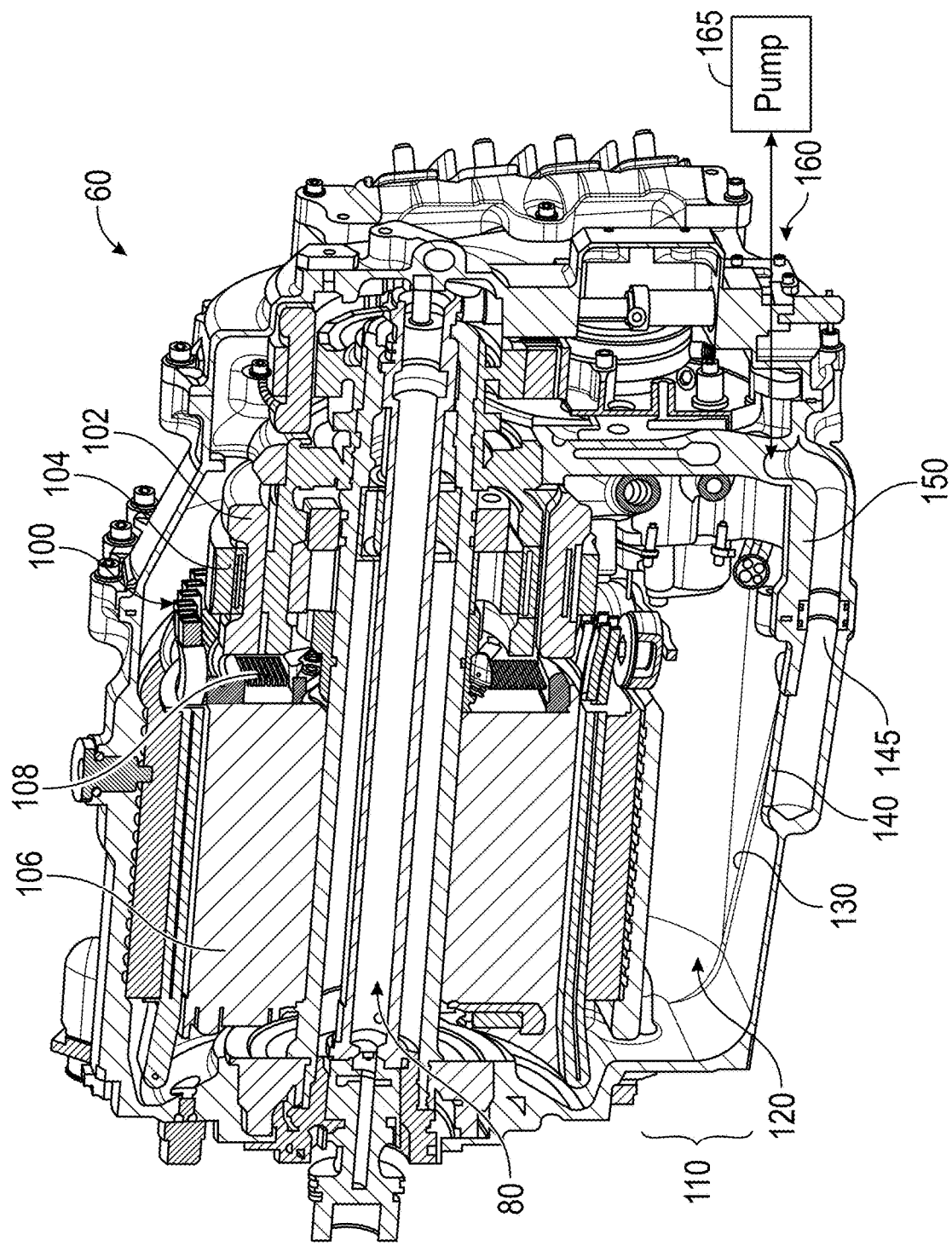
FIG. 3 shows a cross sectional view of the generator along lines A-A of FIG. 2.

Turning to FIG. 3, typical generator components 100 (illustrated schematically) are within the generator 60. Such generator components 100 include a rotor 102 with accompanying magnets 104 and stator 106 with accompanying windings 108. The rotor 102 rotates with the shaft 80. The generator components 100 and the shaft 80 utilize oil for cooling and lubrication purposes.

The generator 60 has a bottom portion 110. The bottom portion 110 defines a sump basin 120. During utilization of the generator 60, oil may drain into the sump basin 120 by gravity. The sump basin 120 includes a sump basin floor 130 and a sump port 140. The sump port 140 may be a machined slot in the sump basin floor 130. A sump tube 145 is connected to the sump basin 120 through the sump port 140. The sump tube 145 is exterior to sump basin 120 and defines a tubular conduit 150 along the sump basin floor 130. The tubular conduit 150 extends from the sump port 140 toward a front end 160 of the generator 60. A scavenge pump 165 (illustrated schematically) suctions oil into the sump tube 145 from the sump port 140. As indicated above the scavenge pump 165 suctions oil from the sump basin 120 for lubricating and cooling the generator 60.

From time to time, pressure in the generator 60 decrease. This can happen, for example, in the event of a failed shaft seal associated with the shaft 80. The effectiveness of the scavenge pump 165 is reduced when pressure in the generator 60 falls to approximately 6 psia (pounds per square inch absolute, e.g., relative to vacuum). This pressure corresponds to ambient pressure when the aircraft is at an altitude of approximately 25000 feet. The loss of effectiveness is because the scavenge pump 165 will suction mostly air, not oil, around the sump port 140 when pressure is less than 6 psia. Thus if the aircraft is cruising above 25000 feet, and a shaft seal failure occurs, the generator 60 will need to be disconnected. This will result in an interruption of service and possible hardware damage. Accordingly there is a need to provide a structure that enables capturing oil that collects in the sump basin 120 at pressures less than 6 psia.

Figure 4A:
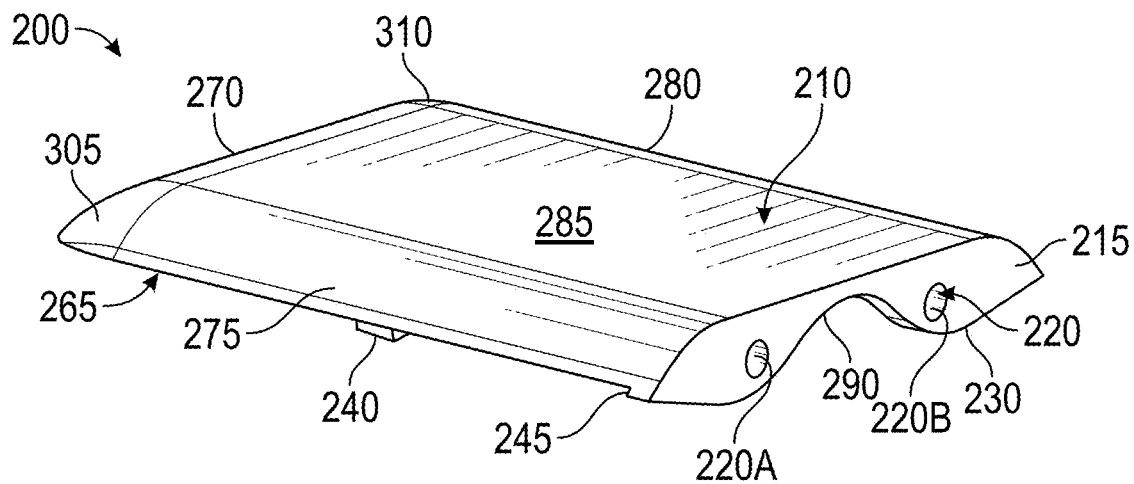
FIG. 4A shows a perspective view of a sump cover for the generator of FIG. 2 according to an embodiment.
Figure 4B:
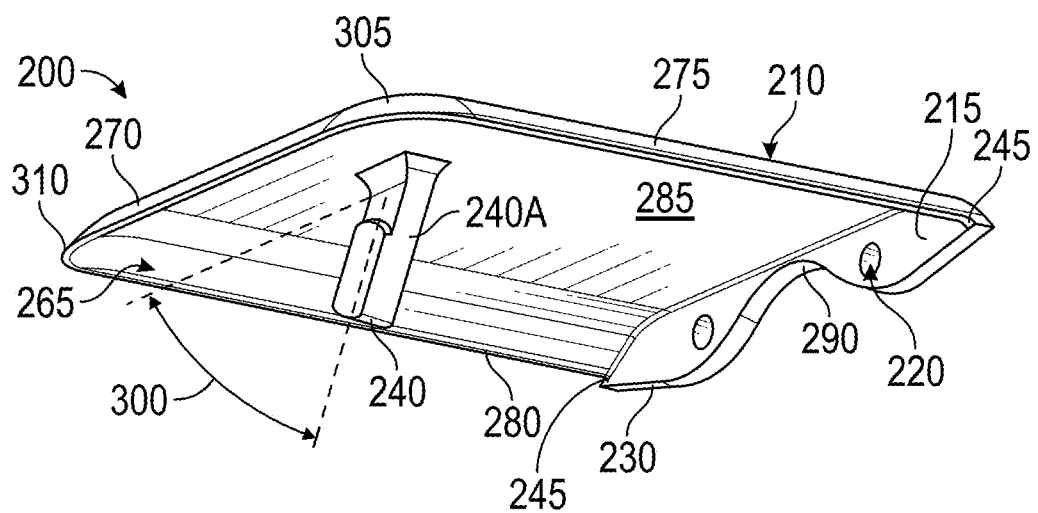
FIG. 4B shows a different perspective view of the sump cover of FIG. 4A.
Figure 5A:
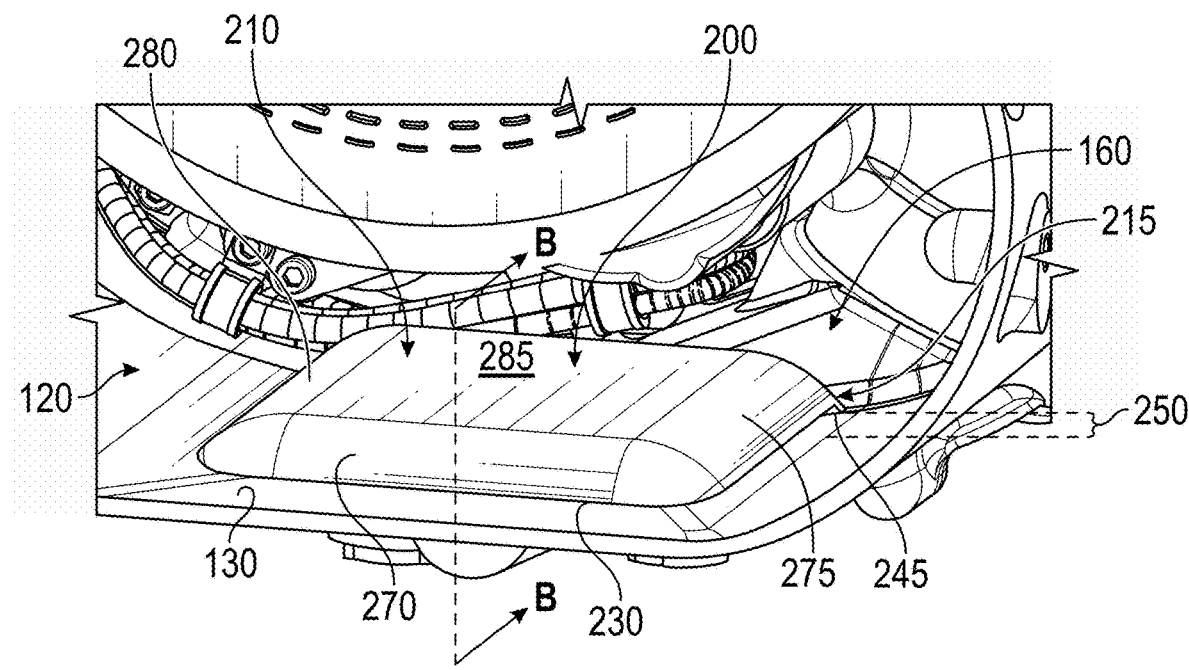
FIG. 5A shows a perspective view of the sump cover of FIG. 4A installed in the generator of FIG. 2.
Figure 5B:
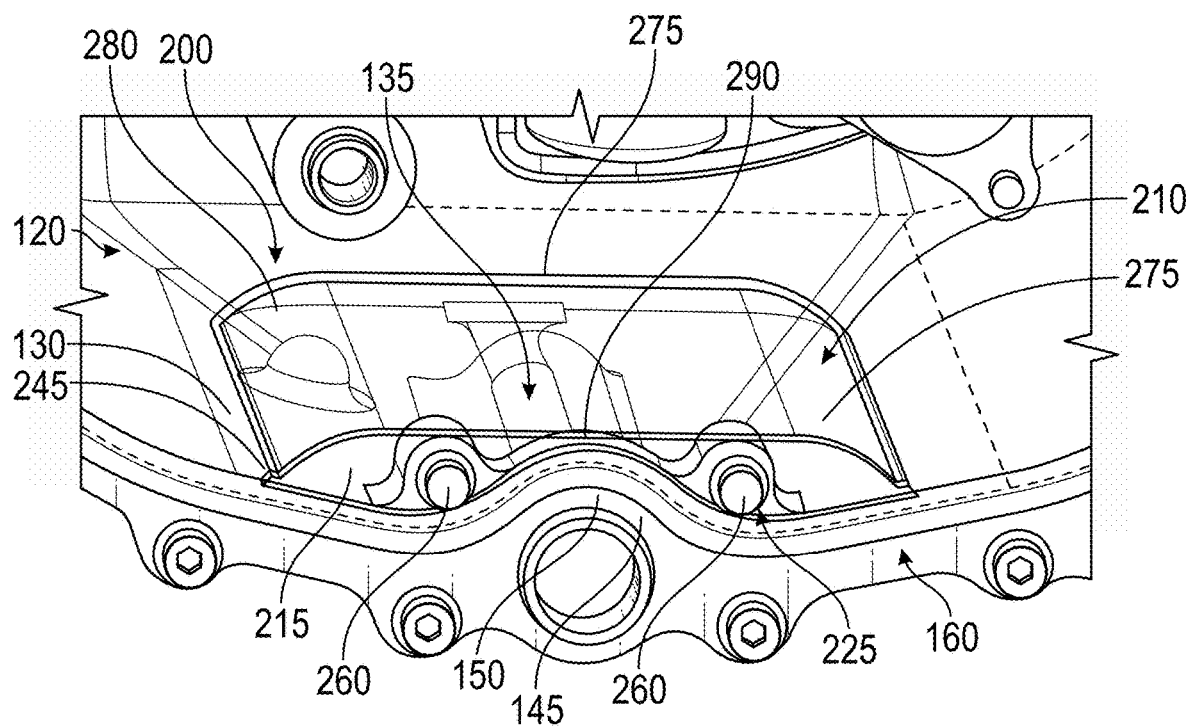
FIG. 5B shows a front perspective view of the sump cover of FIG. 4A installed in the generator of FIG. 2.
Figure 5C:
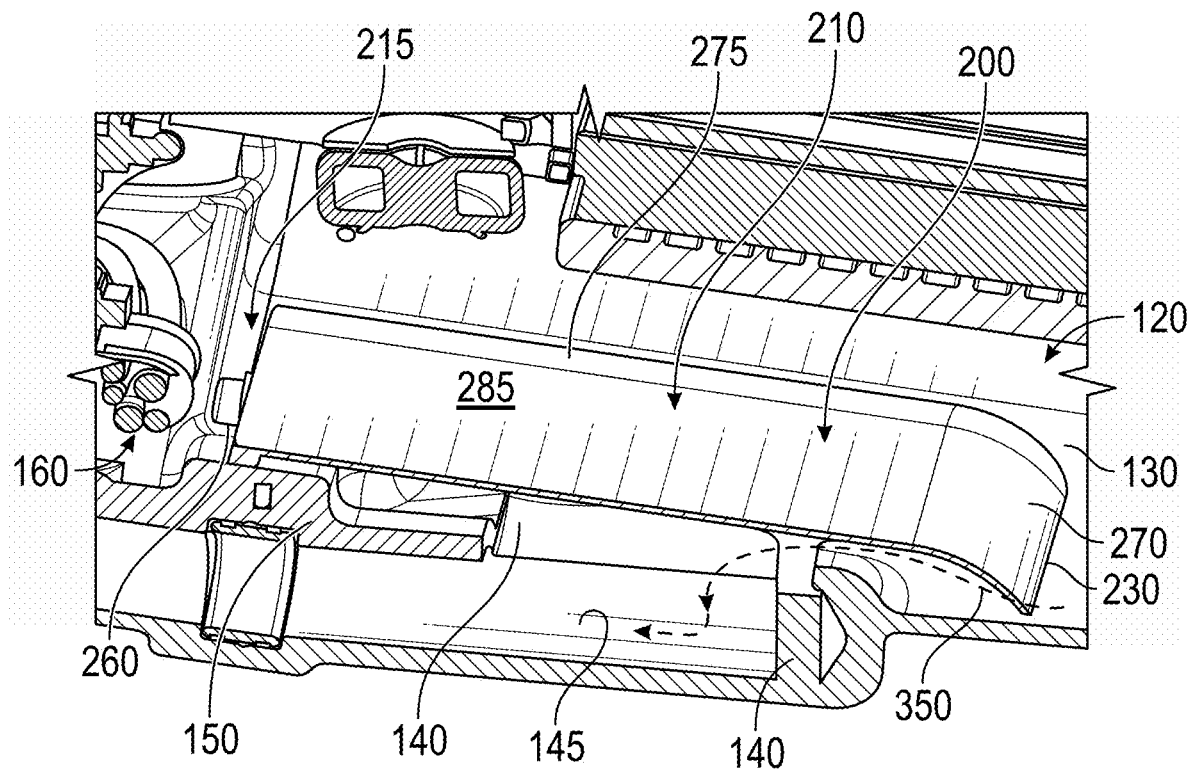
FIG. 5C shows a top perspective view of a cross section along lines B-B in FIG. 5A.

FIGS. 4A and 4B show a sump cover 200 for the sump basin 120, and FIGS. 5A-5C show the sump cover 200 installed in the sump basin 120. The sump cover 200 includes a sump cover shell 210 shaped as an inverted bowl. In the illustrated embodiment the sump cover shell 210 shaped as an inverted rectangular bowl.

A front portion 215 of the sump cover shell 210 includes a first plurality of fastener features 220 (FIGS. 4A and 4B). The first plurality of fastener features 220 are each configured to fasten to one of a second plurality of fastener features 225 in the sump basin 120 (FIGS. 5B and 5C). In one embodiment the second plurality of fastener features 225 are preexisting in the generator 60.

The sump cover 200 includes a perimeter edge 230 (FIGS. 4A and 4B) defined around the sump cover shell 210. A sump cover support 240 extends outwardly from the sump cover shell 210. In one embodiment, the sump cover support 240 extends beyond a lowest point of the perimeter edge 230 when the sump cover 200 is arranged such that top portion is horizontal. Referring again to FIG. 2, the sump cover support 240 is configured to fit through the sump port 140 (FIG. 5C). The sump cover support 240 is configured to be positioned against the sump tube 145 of the sump basin 120.

The sump cover support 240 and the first plurality of fastener features 220 form a multi-point mounting configuration between the sump cover 200 and the sump basin 120 (FIG. 5C). In the illustrated embodiment, the first plurality of fastener features 220 comprise two fastener features 220A, 220B (FIG. 4A). With the combination of the two fastener features 220A, 220B and the sump cover support 240 a three-point mounting configuration is provided between the sump cover 200 and the sump basin 120.

The front portion 215 of the sump cover 200 extends beyond a lowest point of a remainder of the sump cover shell 210 beyond where the sump cover 200 is arranged such that top portion is horizontal (FIGS. 4A and 4B). This configuration defines a perimeter step 245 on both sides of the front portion 215. The perimeter step 245 defines a perimeter flow recess 250 (FIG. 5A) about the sump cover 200, except at the front portion 215. The perimeter flow recess 250 defines a fluid flow path between the sump cover 200 and the sump basin 120. In one embodiment the perimeter step 245, and thus the perimeter flow recess 250, has a height of 0.075 inches. This configuration enables drawing oil across the sump basin 120 into the sump cover 200 through the perimeter flow recess 250 when the scavenge pump 165 is running.

The front portion 215 of the sump cover 200 is thicker than a rest of the sump cover shell 210 of the sump cover 200 (FIGS. 4A and 4B). This configuration assures that reactive loading from the first plurality of fastener features 220 on the front portion 215 will not bend the front portion 215. Such loading may be generated when securing the sump cover 200 in the sump basin 120. In one embodiment the first plurality of fastener features 170 and the second plurality of fastener features 225 are through-holes. In such an embodiment, a plurality of fasteners 260 (FIGS. 5B and 5C) in the form of a plurality of bolts may be utilized to secure the first plurality of fastener features 170 and the second plurality of fastener features 225.

The sump cover shell 210 includes a plurality of perimeter portions 265 (FIGS. 4A and 4B). The plurality of perimeter portions 265 include the front portion 215 and a back portion 270 that opposes the front portion 215. A first side portion 275 opposes a second side portion 280. A top portion 285 is connected to each of the perimeter portions 265 and is substantially planar. Further, the front portion 215 is planar and is substantially perpendicular to the top portion 285.

The front portion 215 of the sump cover 200 includes a perimeter fitting recess 290 between the first plurality of fastener features 220. The perimeter fitting recess 290 forms an arcuate shape. The perimeter fitting recess 290 enables mounting the sump cover 200 against a tubular conduit 150 that forms the sump tube 145 in the sump basin 120 (FIG. 5B).

The sump cover support 240 defines a leg 240A (FIG. 4B) that is disposed at an angle 300 to the top portion 285 (FIGS. 4A and 4B). The sump cover support 240 is closer to the back portion 270 than the front portion 215. The sump cover support 240 is also closer to a first corner 305 than a second corner 310. The first corner 305 is between the back portion 270 and the first side portion 275. The second corner 310 is between the back portion 270 and the second side portion 280. This configuration provides for piloting the sump cover support 240 in the sump port 140 when securing the sump cover support 240 to the sump basin 120. The sump cover support 240 is thereby pressed against a back end 320 of the sump port 140 (FIG. 5C).

Each of the back portion 270, the first side portion 275, the second side portion 280, the first corner 305 and the second corner 310 are curved (FIGS. 4A and 4B). This configuration provides a smooth surface for the oil to flow against when being received in the sump basin 120.

Figure 6:
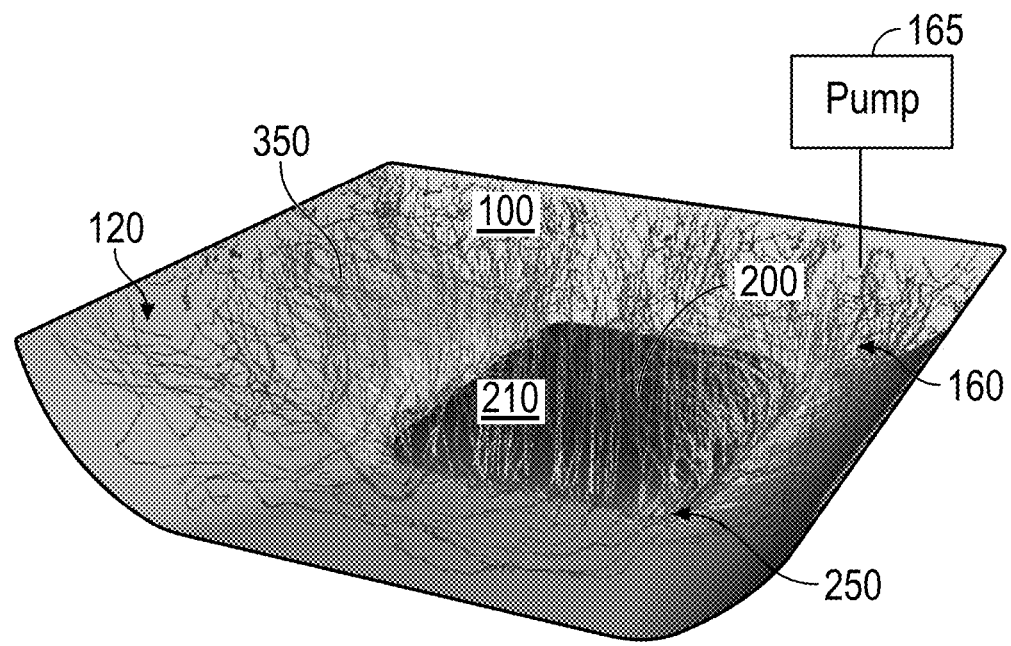
FIG. 6 shows a flow path of oil within the generator according to a disclosed embodiment.

FIG. 6 shows an oil flow path 350 within the generator 60. The front end 160 of the generator 60 is identified for reference. Oil 350 drains from all around the generator components 100 (illustrated schematically) into the sump basin 120. With the sump cover 200 installed in the sump basin 120, the oil 350 drains all around the sump cover shell 210. When the scavenge pump 165 is running, oil 350 is suctioned about the perimeter flow recess 250. Once under the sump cover shell 210, the oil 350 will be suctioned into the sump tube 145 through the sump port 140 (FIG. 5C).

Figure 7:
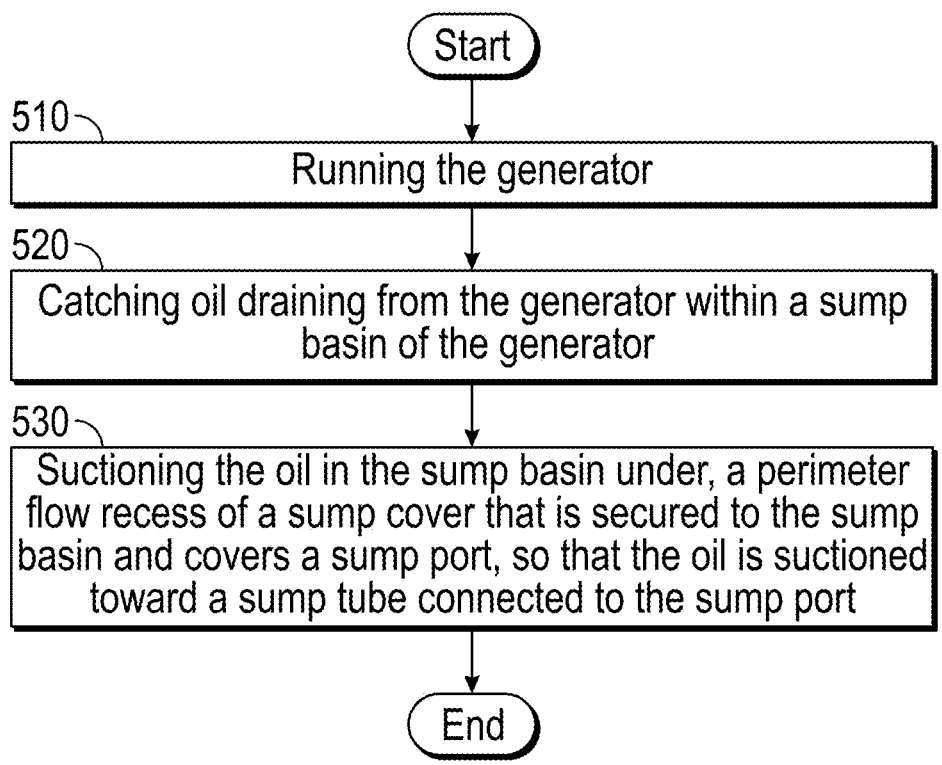
FIG. 7 is a flowchart showing a method of operating a generator according to an embodiment.

FIG. 7 is a flowchart showing a method of operating the generator 60 of the aircraft 10. As shown in block 510, the method includes running the generator 60. As shown in block 520 the method includes catching oil draining from the generator 60 within the sump basin 120. As shown in block 530 the method includes suctioning the oil in the sump basin 120, under the perimeter flow recess 250 of the sump cover 200 that is secured to the sump basin 120 and covers the sump port 135. From this configuration, oil is suctioned toward the sump tube 145 connected to the sump port 135. The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Those of skill in the art will appreciate that various example embodiments are shown and described herein, each having certain features in the particular embodiments, but the present disclosure is not thus limited. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A sump cover for a sump basin of a generator of an aircraft, the sump cover comprising:
    a sump cover shell shaped as an inverted bowl,
    a front portion of the sump cover shell including a first plurality of fastener features, each configured to fasten to one of a second plurality of fastener features in the sump basin; and p1 a sump cover support extending outwardly from the sump cover shell, past a perimeter edge of the sump cover shell, configured to fit through a sump port and against a sump tube of the sump basin,
    wherein:
    the sump cover support and the first plurality of fastener features define a multi-point mounting configuration between the sump cover and the sump basin,
    the front portion extends downwardly beyond a rest of the sump shell to define a perimeter step on both sides of the front portion,
    thereby defining a perimeter flow recess for the sump cover when the sump cover is installed in the sump basin, the perimeter flow recess defining a fluid flow path between the sump cover and the sump basin.

2. The sump cover of claim 1, wherein the perimeter step has a height of 0.075 inches.

3. The sump cover of claim 1, wherein the front portion is thicker than a rest of the sump cover shell of the sump cover.

4. The sump cover of claim 1, wherein the first plurality of fastener features are through-holes.

5. The sump cover of claim 4, wherein the sump cover shell includes:
    a plurality of perimeter portions including the front portion, a back portion that opposes the front portion, a first side portion and a second side portion that opposes the first side portion; and
    a top portion that is substantially planar,
    wherein the front portion is planar and is substantially perpendicular to the top portion.

6. The sump cover of claim 5, wherein the front portion includes a perimeter fitting recess between the first plurality of fastener features, the perimeter fitting recess forming an arcuate shape for mounting the sump cover against a tubular conduit that forms the sump tube in the sump basin.

7. The sump cover of claim 6, wherein the sump cover support defines a leg that is disposed at an angle to the top portion.

8. The sump cover of claim 7, wherein the sump cover support is closer to the back portion than the front portion.

9. The sump cover of claim 8, wherein the sump cover support is closer to a first corner between the back portion and the first side portion than a second corner between the back portion and the second side portion.

10. The sump cover of claim 9, wherein when the sump cover is secured to the sump basin, the sump cover support is piloted into the sump port, whereby the sump cover support is pressed against a back end of the sump port.

11. The sump cover of claim 10, wherein each of the back portion, the first side portion, the second side portion, the first corner and the second corner are curved.

12. A generator of an aircraft, comprising:
the sump cover of claim 1,
a shaft extending through the generator;
the sump basin defined by a bottom portion of the generator;
the sump basin including the sump port;
the sump tube connected to the sump basin through the sump port, the sump tube being exterior to the sump basin; and
the bottom portion of the generator further including the second plurality of fastener features;
wherein:
the sump cover is supported over the sump port;
the first plurality of fastener features is fastened to the second plurality of fastener features; and
the sump cover support extends through the sump port and is disposed in the sump tube of the sump basin.

13. The generator of claim 12, wherein the second plurality of fastener features are through-holes.

14. The generator of claim 13, wherein a plurality of bolts each engage one of the first plurality of fastener features and a corresponding one of the second plurality of fastener features.

15. The generator of claim 14, wherein: a tubular conduit is formed in the sump basin that defines the sump tube, the tubular conduit being disposed between the second plurality of fastener features; and the front portion includes a perimeter fitting recess between the first plurality of fastener features, the perimeter fitting recess forming an arcuate shape for mounting the sump cover against the tubular conduit.

16. The generator of claim 15, wherein the sump port includes a back end, and the sump cover support is piloted into the sump port, whereby the sump cover support is pressed against the back end of the sump port.

17. An aircraft including the generator of claim 16.

18. The generator of claim 12, wherein:
the perimeter flow recess between the sump cover and the bottom portion of the generator is 0.075 inches.

19. A method of operating a generator of an aircraft, comprising:
running the generator;
catching oil that is draining from the generator within a sump basin of the generator; and
suctioning the oil in the sump basin, under a perimeter flow recess of a sump cover that is secured to the sump basin and covers a sump port, so that the oil is suctioned toward the sump port,
wherein, the sump cover includes:
a sump cover shell shaped as an inverted bowl,
a front portion of the sump cover shell including a first plurality of fastener features, each configured to fasten to one of a second plurality of fastener features in the sump basin; and
a sump cover support extending outwardly from the sump cover shell, past a perimeter edge of the sump cover shell, configured to fit through the sump port and against a sump tube of the sump basin,
wherein:
the sump cover support and the first plurality of fastener features define a multi-point mounting configuration between the sump cover and the sump basin;
the front portion extends downwardly beyond a rest of the sump cover shell to define a perimeter step on both sides of the front portion,
thereby defining the perimeter flow recess for the sump cover when the sump cover is installed in the sump basin, the perimeter flow recess defining a fluid flow path between the sump cover and the sump basin.

* * * * *